United States Patent [19]

Ghosh et al.

[11] Patent Number: 5,932,532

[45] Date of Patent: *Aug. 3, 1999

[54] BLEACH COMPOSITIONS COMPRISING PROTEASE ENZYME

[75] Inventors: Chanchal Kumar Ghosh, West Chester; Gayle Marie Frankenbach; Catherine Michelle Quinn, both of Cincinnati, all of Ohio

[73] Assignee: Procter & Gamble Company, Cincinnati, Ohio

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/931,684

[22] Filed: Sep. 16, 1997

Related U.S. Application Data

[63] Continuation-in-part of application No. 08/322,677, Oct. 13, 1994, Pat. No. 5,677,272, which is a continuation-in-part of application No. 08/136,626, Oct. 14, 1993, abandoned, and application No. 08/237,938, May 2, 1994, abandoned.

[51] Int. Cl.$^6$ .......................... C11D 3/386; C11D 3/395
[52] U.S. Cl. ..................... 510/320; 510/321; 510/305; 510/306; 510/312; 510/375; 510/392; 510/501; 510/530
[58] Field of Search .................. 510/305, 306, 510/312, 320, 321, 375, 392, 501, 530

[56] References Cited

U.S. PATENT DOCUMENTS

| | | | |
|---|---|---|---|
| 2,220,099 | 11/1940 | Guenther | 260/505 |
| 2,477,383 | 7/1949 | Lewis | 252/161 |
| 3,128,287 | 4/1964 | Berg | 252/97 |
| 3,308,067 | 3/1967 | Diehl | 252/161 |
| 3,579,454 | 5/1971 | Collier | 252/97 |
| 3,635,830 | 1/1972 | Lamberti et al. | 252/152 |
| 3,664,961 | 5/1972 | Norris | 252/99 |
| 3,723,322 | 3/1973 | Diehl | 252/89 |
| 3,974,082 | 8/1976 | Weyn | 252/95 |
| 3,996,152 | 12/1976 | Edwards et al. | 252/186 |
| 4,003,700 | 1/1977 | Gray et al. | 8/111 |
| 4,013,575 | 3/1977 | Castrantas | 252/104 |
| 4,100,095 | 7/1978 | Hutchins | 252/99 |
| 4,318,904 | 3/1982 | Shaw | 424/177 |
| 4,381,247 | 4/1983 | Hakagawa et al. | 252/95 |
| 4,412,934 | 11/1983 | Chung et al. | 252/186.38 |
| 4,539,132 | 9/1985 | Oakes | 252/95 |
| 4,597,886 | 7/1986 | Goedhart | 252/95 |
| 4,620,936 | 11/1986 | Kielman | 252/99 |
| 4,634,551 | 1/1987 | Burns et al. | 252/102 |
| 4,642,198 | 2/1987 | Humphreys et al. | 252/94 |
| 4,655,781 | 4/1987 | Hsieh et al. | 8/111 |
| 4,655,954 | 4/1987 | Broze | 252/102 |
| 4,663,071 | 5/1987 | Bush et al. | 252/174.19 |
| 4,664,839 | 5/1987 | Rieck | 252/175 |
| 4,670,178 | 6/1987 | Huth | 252/95 |
| 4,686,063 | 8/1987 | Burns | 252/102 |
| 4,707,291 | 11/1987 | Thom | 252/174.12 |
| 4,758,369 | 7/1988 | Dryoff et al. | 252/94 |
| 4,760,025 | 7/1988 | Estell et al. | 435/222 |
| 4,767,557 | 8/1988 | Herdeman | 252/91 |
| 4,769,173 | 9/1988 | Cornelissen et al. | 252/174.12 |
| 4,770,815 | 9/1988 | Baker et al. | 252/542 |
| 4,781,854 | 11/1988 | Overton et al. | 252/100 |
| 4,818,425 | 4/1989 | Meijer et al. | 252/94 |
| 4,824,591 | 4/1989 | Dryoff et al. | 252/94 |
| 4,824,592 | 4/1989 | Rerek et al. | 252/95 |

(List continued on next page.)

FOREIGN PATENT DOCUMENTS

| | | |
|---|---|---|
| 8772281-A | 11/1987 | Australia . |
| 0 167 375 | 7/1985 | European Pat. Off. . |
| 0 176 124 | 4/1986 | European Pat. Off. . |
| 0 201 958 | 11/1986 | European Pat. Off. . |
| 0 240 481 | 3/1987 | European Pat. Off. . |
| 0 247 421 | 12/1987 | European Pat. Off. . |
| 0 256 443 | 2/1988 | European Pat. Off. . |
| 0 340 847 | 11/1989 | European Pat. Off. . |
| 0 350 096 A2 | 1/1990 | European Pat. Off. . |
| 0 359 087 A2 | 3/1990 | European Pat. Off. . |
| 0 405 902 A1 | 1/1991 | European Pat. Off. . |
| 0 407 225 A1 | 1/1991 | European Pat. Off. . |
| 0 416 967 A1 | 3/1991 | European Pat. Off. . |
| 91/06637 | 5/1991 | WIPO . |

OTHER PUBLICATIONS

USSN 07/938,666, Nicholson, Aug. 31, 1992.

"Protein Engineering as a Tool to Obtain Better Proteases for Use in Detergents", J.H. Van Ee, Chimicaoggi, Jul.–Aug. 1991.

U.S. application no. 08/064,562, A. D. Willey, filed May 20, 1993.

U.S. application no. 08/064,623, A. D. Willey et al, filed May 20, 1993.

U.S. application no. 08/064,624, A. D. Willey et al, filed May 20, 1993.

U.S. application no. 08/082,270, A. D. Willey et al, filed Jun. 24, 1993.

U.S. application no. 08/136,518, D. N. DiGuilio et al, filed Oct. 14, 1993.

U.S. application no. 08/136,626, M. E. Burns et al, filed Oct. 14, 1993.

U.S. application no. 08/136,797, C. K. Ghosh et al, filed Oct. 14, 1993.

U.S. application no. 08/151,085, M. E. Burns et al, filed Nov. 12, 1993.

U.S. application no. 08/196,322, M. E. Burns et al, filed Feb. 15, 1994.

*Primary Examiner*—Kery Fries
*Attorney, Agent, or Firm*—C. Brant Cook; K. William Zerby; Jacobus C. Rasser

[57] ABSTRACT

Bleaching and cleaning compositions comprising a bleaching compound, one or more bleach activators, and protease enzymes are provided. Thus, laundry detergent compositions which comprise protease, perborate or percarbonate and activators such as benzoyl caprolactain exhibit improved dingy clean-up performance.

5 Claims, No Drawings

U.S. PATENT DOCUMENTS

| | | | |
|---|---|---|---|
| 4,828,747 | 5/1989 | Rerek et al. | 252/95 |
| 4,852,989 | 8/1989 | Burns et al. | 8/107 |
| 4,853,143 | 8/1989 | Hardy | 252/102 |
| 4,861,509 | 8/1989 | Cornelissen et al. | 252/174.12 |
| 4,876,023 | 10/1989 | Hayda | 252/90 |
| 4,886,615 | 12/1989 | Dehan | 252/90 |
| 4,909,953 | 3/1990 | Sadlowski et al. | 252/99 |
| 4,919,836 | 4/1990 | Meijer et al. | 252/94 |
| 4,927,558 | 5/1990 | Aaslyng | 252/174.12 |
| 4,929,377 | 5/1990 | Emmons et al. | 251/100 |
| 4,966,723 | 10/1990 | Hodge et al. | 252/102 |
| 4,983,315 | 1/1991 | Glogowski | 252/2 |
| 4,997,590 | 3/1991 | Bowling | 252/186.38 |
| 5,002,687 | 3/1991 | Roberts et al. | 252/174.12 |
| 5,004,558 | 4/1991 | Dryoff et al. | 252/95 |
| 5,030,378 | 7/1991 | Mitchell | 252/102 |
| 5,047,163 | 9/1991 | Batal et al. | 252/102 |
| 5,049,298 | 9/1991 | Ploumen | 252/95 |
| 5,053,333 | 10/1991 | Yamamoto | 435/212 |
| 5,055,218 | 10/1991 | Getty et al. | 252/94 |
| 5,069,809 | 12/1991 | Lagerwaard et al. | 252/174.12 |
| 5,091,106 | 2/1992 | Jacobs et al. | 252/186.26 |
| 5,126,066 | 6/1992 | Toroenbeek et al. | 252/95 |
| 5,130,044 | 7/1992 | Mitchell et al. | 252/102 |
| 5,130,045 | 7/1992 | Mitchell et al. | 252/102 |
| 5,167,854 | 12/1992 | Deleeuw | 252/186.27 |
| 5,173,207 | 12/1992 | Drapier | 252/99 |
| 5,174,927 | 12/1992 | Honsa | 252/543 |
| 5,179,003 | 1/1993 | Wolf | 435/69.1 |
| 5,182,204 | 1/1993 | Estell | 435/222 |
| 5,185,250 | 2/1993 | Caldwell et al. | 435/69.3 |
| 5,185,258 | 2/1993 | Caldwell et al. | 435/220 |
| 5,204,015 | 4/1993 | Caldwell | 252/174.12 |
| 5,211,874 | 5/1993 | Haendler | 252/186.26 |
| 5,215,907 | 6/1993 | Tang | 435/219 |
| 5,244,791 | 9/1993 | Estell | 435/68.1 |
| 5,292,446 | 3/1994 | Painter | 252/99 |
| 5,318,728 | 6/1994 | Surutzidis | 252/548 |
| 5,324,653 | 6/1994 | van Eekelen et al. | 435/221 |
| 5,336,611 | 8/1994 | van Eekelen et al. | 435/221 |
| 5,405,412 | 4/1995 | Willey | 8/111 |
| 5,677,272 | 10/1997 | Ghosh et al. | 510/306 |
| 5,707,950 | 1/1998 | Kasturi et al. | 510/320 |
| 5,769,630 | 10/1997 | Baeck et al. | 510/305 |
| 5,837,010 | 11/1998 | Barck et al. | 8/137 |
| 5,837,517 | 11/1998 | Sierkstra et al. | 435/221 |

BLEACH COMPOSITIONS COMPRISING PROTEASE ENZYME

This application is a continuation-in-part of U.S. patent application Ser. No. 08/322,677, filed Oct. 13, 1994, now U.S. Pat. No. 5,677,272 which is a continuation-in-part of U.S. application Ser. No. 08/136,626, filed Oct. 14, 1993, now abandoned, and U.S. application Ser. No. 08/237,938, filed May 2, 1994, now abandoned.

TECHNICAL FIELD

The present invention relates to cleaning and bleaching compositions which employ protease enzymes to boost performance especially on dingy stains and soil. Bleaching, fabric laundering, automatic dishwashing and sanitizing compositions with improved bleach activity are provided.

BACKGROUND OF THE INVENTION

It has been found that certain levels of bleach activators and peroxygen bleaching compounds can be used with certain levels of protease enzymes in bleaching compositions to obtain surprisingly effective dingy soil clean-up. The combined effect of the bleach activators, peroxygen bleaching compound and the proteases, which hydrolyzes protein based stains, is greater in this bleaching composition than expected, especially in light of the fact that bleach is known to oxidize enzymes. Without meaning to be limited by theory, it is believed that at these levels, there is a synergy between the bleach activator/peroxygen bleaching compound and the protease so that the combined cleaning effect of the two is greater than the additive effect of each one separately.

Accordingly, it is an object of the present invention to provide improved cleaning and bleaching compositions using bleaching compounds and protease enzymes. It is another object herein to provide a means for removing dingy soils and stains from fabrics using the bleaching systems and protease enzymes of this invention. These and other objects are secured herein, as will be seen from the following disclosures.

BACKGROUND ART

The use of amido-derived bleach activators in laundry detergents is described in U.S. Pat. No. 4,634,551. Lactam activators are described in copending applications Serial Nos. 08/064,624; 08/064,562; 08/196,322; and 08/082,270.

Protease enzymes are described in EP 90915958:4; U.S. Pat. No. 5,185,250; U.S. Pat. No. 5,204,015; copending application U.S. Ser. No.08/136,797; and copending application U.S. Ser. No. 08/136,626.

SUMMARY OF THE INVENTION

The present invention encompasses bleach compositions which provide dingy clean-up comprising protease enzymes, a bleach compound capable of yielding hydrogen peroxide in an aqueous liquor, and one or more bleach activators, such that the combined performance of the bleach activator/bleaching compound and the protease enzyme as measured by the Hunter Whiteness Value is more than additive; and wherein further such compositions do not comprise nonanoyloxybenzenesulfonate (NOBS) as the sole bleach activator.

Modified protease bacterial serine protease enzymes obtained from *Bacillus subtilis, Bacillus lentus* or *Bacillus licheniformis* are preferred. Said enzymes comprise at least about 0.001%, preferably from about 0.001% to about 5%, of the detergent compositions.

Preferred bleaching agents are members selected from the group consisting of $H_2O_2$, perborate, percarbonate, persulfate and mixtures thereof. Particularly preferred bleaching agents comprise percarbonate or perborate bleach, or mixtures thereof. Preferred bleach activators are selected from acyl lactam-type activators, amido-derived activators, alkanoyloxybenzenesulfonates, and mixtures thereof.

Particularly preferred activators which are employed in the present invention include benzoyl caprolactam, nonanoyl caprolactam, benzoyl valerolactam, nonanoyl valerolactam, 3,5,5-trimethylhexanoyl caprolactam, 3,5,5-trimethylhexanoyl valerolactam, octanoyl caprolactam, octanoyl valerolactam, decanoyl caprolactam, decanoyl valerolactam, undecenoyl caprolactam, undecenoyl valerolactam, (6-octanamidocaproyl)oxybenzenesulfonate, (6-nonanamidocaproyl)-oxybenzenesulfonate, (6-decanamidocaproyl)oxybenzenesulfonate, benzoyloxybenzenesulfonate, and mixtures thereof. Examples of highly preferred substituted benzoyl lactams include methylbenzoyl caprolactam, methylbenzoyl valerolactam, ethylbenzoyl caprolactam, ethylbenzoyl valerolactam, propylbenzoyl caprolactam, propylbenzoyl valerolactam, isopropylbenzoyl caprolactam, isopropylbenzoyl valerolactam, butylbenzoyl caprolactam, butylbenzoyl valerolactam, tert-butylbenzoyl caprolactam, tert-butylbenzoyl valerolactam, pentylbenzoyl caprolactam, pentylbenzoyl valerolactam, hexylbenzoyl caprolactam, hexylbenzoyl valerolactam, ethoxybenzoyl caprolactam, ethoxybenzoyl valerolactam, propoxybenzoyl caprolactam, propoxy-benzoyl valerolactam, isopropoxybenzoyl caprolactam, isopropoxybenzoyl valero-lactam, butoxybenzoyl caprolactam, butoxybenzoyl valerolactam, tert-butoxybenzoyl caprolactam, tert-butoxybenzoyl valerolactam, pentoxybenzoyl capro-lactam, pentoxybenzoyl valerolactam, hexoxybenzoyl caprolactam, hexoxybenzoyl valerolactam, 2,4,6-trichlorobenzoyl caprolactam, 2,4,6-trichlorobenzoyl valerolactam, pentafluorobenzoyl caprolactam, pentafluorobenzoyl valerolactam, dichlorobenzoyl caprolactam, dimethoxybenzoyl caprolactam, 4-chlorobenzoyl caprolactam, 2,4-dichlororbenzoyl caprolactam, terephthaloyl dicaprolactam, pentafluorobenzoyl caprolactam, pentafluorobenzoyl valerolactam, dichlorobenzoyl valerolactam, dimethoxybenzoyl valerolactam, 4-chlorobenzoyl valerolactam, 2,4-dichlorobenzoyl valerolactam, terephthaloyl divalerolactam, 4-nitrobenzoyl caprolactam, 4-nitrobenzoyl valerolactam, dinitro-benzoyl caprolactam, dinitrobenzoyl valerolactam, and mixtures thereof. The compositions herein may also comprise NOBS, but not as the sole bleach activator present in the bleaching composition.

Particularly preferred are bleach activators selected from the group consisting of benzoyl caprolactam, benzoyl valerolactam, nonanoyl caprolactam, nonanoyl valerolactam, 4-nitrobenzoyl caprolactam, 4-nitrobenzoyl valerolactam, octanoyl caprolactam, octanoyl valerolactam, decanoyl caprolactam, decanoyl valerolactam, undecanoyl caprolactam, undecanoyl valerolactam, 3,5,5-trimethylhexanoyl caprolactam, 3,5,5-trimethylhexanoyl valerolactam, dinitrobenzoyl caprolactam, dinitrobenzoyl valerolactam, terephthaloyl dicaprolactam, terephthaloyl divalerolactam, (6-octanamidocaproyl) oxybenzenesulfonate, (6-nonanamido-caproyl) oxybenzenesulfonate, (6-decanamidocaproyl) oxybenzenesulfonate, benzoyloxybenzenesulfonate, and mixtures thereof.

Preferably, the molar ratio of hydrogen peroxide yielded by the peroxygen bleaching compound to bleach activator is greater than about 1.0. Most preferably, the molar ratio of hydrogen peroxide to bleach activator is at least about 1.5.

The invention also encompasses detergent compositions, especially laundry detergents, comprising otherwise conventional surfactants and other detersive ingredients.

All percentages, ratios and proportions herein are by weight, unless otherwise specified. All documents cited are, in relevant part, incorporated herein by reference.

DETAILED DESCRIPTION OF THE INVENTION

Without limitation by theory, it is believed that dingy soils and stains are the result of combinations of fatty soils and particulate soils. Fatty soils comprise lipids, proteins, and pigments that are deposited on fabrics from contact with human or animal skin. The majority of lipids are secreted from the sebecous gland as sebum. Proteins and pigments from skin fragments are liberated by the breakdown of skin cells. Particulate soils comprise mostly airborne soil and floor/ground dust. It is believed that sebum is the major soil present on laundry, and its removal is important because unremoved fat acts as a matrix to hold particulate soils. Further it is believed that compounds present in the sebum oxidize to contribute to yellowing of fabrics. Particulate soils include topsoil and products produced during the incomplete combustion of petroleum products.

The performance on dingy clean-up can be measured in terms of the Hunter Whiteness Values (W), which is calculated according to the following equation:

$$W=(7L^2-40\ Lb)/700$$

wherein L,a,b are determined from a tristimulus meter reading and represent a three axis opponent color scale system based on the theory that color is perceived by black-white (L), red-green (a), and yellow-blue (b) sensations. The higher the value for W, the better the whiteness performance and dingy clean-up. See R. S. Hunter and R. W. Harold, *The Measurement of Appearance*, Second Ed., John Wiley & Sons, New York, 1987 and *ASTM Standards on Color and Appearance Measurement*, Third Ed., ASTM, Philadelphia, Pa., 1991.

Compositions of the present invention comprise protease enzyme and bleach activator/bleach compounds at levels such that the Hunter Whiteness Value for the composition is more than additive, i.e., the W for the composition is greater than the sum of the W's for compositions without protease plus the W's for compositions without the bleach activator/bleach compound as determined by a statistically significant number of tests.

Protease enzymes Protease enzymes are usually present in such commercial preparations at levels sufficient to provide at least about 0.005 Anson units (AU) of activity per gram of composition. Therefore, said enzymes comprise at least about 0.001%, preferably from about 0.001% to about 5%, of the detergent compositions.

Suitable examples of proteases are the subtilisins which are obtained from particular strains of *B.subtilis, B.lentus* and *B.licheniforms.* Another suitable protease is a modified bacterial serine protease enzyme obtained from *Bacillus subtilis* or *Bacillus licheniformis,* having maximum activity throughout the pH range of 8–12, developed and sold by Novo Industries A/S under the registered trade name ESPERASE. The preparation of this enzyme and analogous enzymes is described in British Patent Specification No. 1,243,784 of Novo. Proteolytic enzymes suitable for removing protein-based stains that are commercially available include those sold under the tradenames ALCALASE and SAVINASE by Novo Industries A/S (Denmark) and MAXATASE by International Bio-Synthetics, Inc. (The Netherlands). Other proteases include Protease A (see European Patent Application 130,756, published Jan. 9, 1985) and Protease B (see European Patent Application Serial No. 87303761.8, filed Apr. 28, 1987, and European Patent Application 130,756, Bott et al, published Jan. 9, 1985). Most preferred is what is called herein "Protease C", which is a variant of an alkaline serine protease from Bacillus, particularly *Bacillus lentus,* in which arginine replaced lysine at position 27, tyrosine replaced valine at position 104, serine replaced asparagine at position 123, and alanine replaced threonine at position 274. Protease C is described in EP 90915958:4; U.S. Pat. No. 5,185,250, and U.S. Pat. No. 5,204,015. Also preferred are protease which are described in copending application U.S. Ser. No.08/136,797, entitled Protease-Containing Cleaning Compositions and copending application U.S. Ser. No. 08/136,626, entitled Bleaching Compositions Comprising Protease Enzymes, which are incorporated herein by reference. Genetically modified variants, particularly of Protease C, are also included herein.

Bleaching Compounds—Bleaching compositions herein contain bleaching mixtures containing a bleaching agent and one or more bleach activators, in an amount sufficient to provide bleaching of the stain or stains of interest. Bleaching agents will typically be at levels of from about 1% to about 80%, more typically from about 5% to about 20%, of the detergent composition, especially for fabric laundering. Bleach and pre-soak compositions may comprise from 5% to 99% of the bleaching agent. The amount of bleach activators will typically be from about 0.1% to about 60%, more typically from about 0.5% to about 40% of the bleaching mixture comprising the bleaching agent-plus-bleach activator.

The bleaching agents used herein can be any of the bleaching agents useful for detergent compositions in textile cleaning, hard surface cleaning, or other cleaning purposes that are now known or become known. These include oxygen bleaches as well as other bleaching agents. Perborate bleaches, e.g., sodium perborate (e.g., mono- or tetra-hydrate) can be used herein.

Peroxygen bleaching agents are preferably used in the compositions. Suitable peroxygen bleaching compounds include sodium carbonate peroxyhydrate and equivalent "percarbonate" bleaches, sodium pyrophosphate peroxyhydrate, urea peroxyhydrate, and sodium peroxide. Persulfate bleach (e.g., OXONE, manufactured commercially by DuPont) can also be used.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with silicate, borate or water-soluble surfactants. Percarbonate is available from various commercial sources such as FMC, Solvay and Tokai Denka.

The compositions of the present invention may also comprise mixtures of bleaching activators.

Peroxygen bleaching agents, the perborates, the percarbonates, etc., are preferably combined with bleach activators, which lead to the in situ production in aqueous solution (i.e., during the washing process) of the peroxy acid corresponding to the bleach activator.

Alkanoyloxybenzenesulfonates—Suitable alkanoyloxybenzenesulfonate bleach activators which can be employed in the present invention are of the formula:

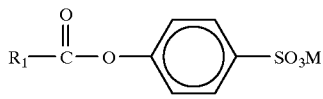

wherein $R_1$—C(O)— contains from about 8 to about 12 carbon atoms (provided that when $R_1$ is nonanoyl the compositions herein comprise at least one other bleach activator) and M is a suitable cation, such as an alkali metal, ammonium, or substituted ammonium cation, with sodium and potassium being most preferred.

Highly preferred hydrophobic alkanoyloxybenzenesulfonates are selected from the group consisting of 3,5,5-trimethylhexanoyloxybenzenesulfonate, 2-ethylhexanoyloxybenzenesulfonate, octanoyloxybenzenesulfonate, decanoyloxybenzenesulfonate, dodecanoyloxybenzenesulfonate, and mixtures thereof.

Amido Derived Bleach Activators—The amido derived bleach activators which can be employed in the present invention are amide substituted compounds of the general formulas:

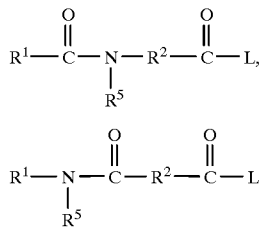

or mixtures thereof, wherein $R^1$, $R^2$ and $R^5$ are as defined above and L can be essentially any suitable leaving group. A leaving group is any group that is displaced from the bleaching activator as a consequence of the nucleophilic attack on the bleach activator by the perhydroxide anion. This, the perhydrolysis reaction, results in the formation of the peroxycarboxylic acid. Generally, for a group to be a suitable leaving group it must exert an electron attracting effect. It should also form a stable entity so that the rate of the back reaction is negligible. This facilitates the nucleophilic attack by the perhydroxide anion.

The L group must be sufficiently reactive for the reaction to occur within the optimum time frame (e.g., a wash cycle). However, if L is too reactive, this activator will be difficult to stabilize for use in a bleaching composition. These characteristics are generally paralleled by the pKa of the conjugate acid of the leaving group, although exceptions to this convention are known. Ordinarily, leaving groups that exhibit such behavior are those in which their conjugate acid has a pKa in the range of from about 4 to about 13, preferably from about 6 to about 11 and most preferably from about 8 to about 11.

Preferred bleach activators are those of the above general formula wherein $R^1$, $R^2$ and $R^5$ are as defined for the peroxyacid and L is selected from the group consisting of:

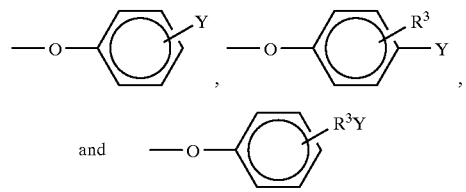

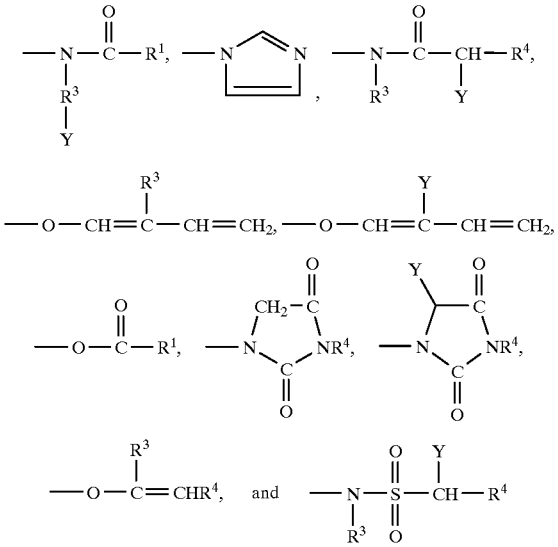

and mixtures thereof, wherein $R^1$ is an alkyl, aryl, or alkaryl group containing from about 1 to about 14 carbon atoms, $R^3$ is an alkyl chain containing from 1 to about 8 carbon atoms, $R^4$ is H or $R^3$, and Y is H or a solubilizing group.

The preferred solubilizing groups are —$SO_3^-M^+$, —$CO_2^-M^+$, —$SO_4^-M^+$, —$N^+(R^3)_4X^-$ and $O \leftarrow N(R^3)_3$ and most preferably —$SO_3^-M^+$ and —$CO_2^{-M+}$ wherein $R^3$ is an alkyl chain containing from about 1 to about 4 carbon atoms, M is a cation which provides solubility to the bleach activator and X is an anion which provides solubility to the bleach activator. Preferably, M is an alkali metal, ammonium or substituted ammonium cation, with sodium and potassium being most preferred, and X is a halide, hydroxide, methylsulfate or acetate anion. It should be noted that bleach activators with a leaving group that does not contain a solubilizing groups should be well dispersed in the bleaching solution in order to assist in their dissolution.

Preferred bleach activators are those of the above general formula wherein L is selected from the group consisting of:

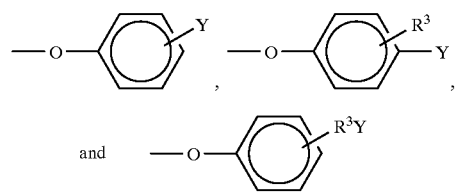

wherein $R^3$ is as defined above and Y is —$SO_3^-M^+$ or —$CO_2^-M^+$ wherein M is as defined above.

Preferred examples of bleach activators of the above formulae include (6-octanamidocaproyl)oxybenzenesulfonate, (6-nonanamidocaproyl)oxybenzenesulfonate, (6-decanamidocaproyl)oxybenzenesulfonate, and mixtures thereof.

Another important class of bleach activators provide organic peracids as described herein by ring-opening as a consequence of the nucleophilic attack on the carbonyl carbon of the cyclic ring by the perhydroxide anion. For instance, this ring-opening reaction in lactam activators involves attack at the lactam ring carbonyl by hydrogen peroxide or its anion. Since attack of an acyl lactam by hydrogen peroxide or its anion occurs preferably at the exocyclic carbonyl, obtaining a significant fraction of ring-opening may require a catalyst.

When the activators are used, optimum surface bleaching performance is obtained with washing solutions wherein the pH of such solution is between about 8.5 and 10.5 and preferably between 9.5 and 10.5 in order to facilitate the perhydrolysis reaction. Such pH can be obtained with substances commonly known as buffering agents, which are optional components of the bleaching systems herein.

Still another class of preferred bleach activators includes the acyl lactam activators, especially acyl caprolactams and acyl valerolactams of the formulae:

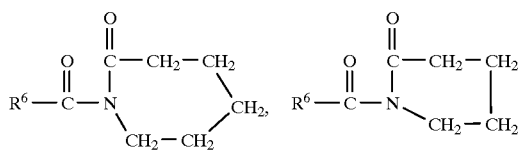

wherein $R^6$ is H, an alkyl, aryl, alkoxyaryl, or alkaryl group containing from 1 to bout 12 carbon atoms, or a substituted phenyl group containing from about 6 to about 18 carbons. See copending U.S. applications Ser. No. 08/064,562 and 08/082,270, which disclose substituted benzoyl lactams. See also U.S. Pat. No. 4,545,784, issued to Sanderson, October 8, 1985, incorporated herein by reference, which discloses acyl caprolactams, including benzoyl caprolactam, adsorbed into sodium perborate.

Various nonlimiting examples of activators which may also comprise the bleach compositions disclosed herein include those in U.S. Pat. No. 4,915,854, issued Apr. 10, 1990 to Mao et al, and U.S. Pat. No. 4,412,934. See also U.S. Pat. No. 4,634,551 for other typical bleaches and activators useful herein.

Adjunct Ingredients

The compositions herein can optionally include one or more other detergent adjunct materials or other materials for assisting or enhancing cleaning performance, treatment of the substrate to be cleaned, or to modify the aesthetics of the detergent composition (e.g., perfumes, colorants, dyes, etc.). The following are illustrative examples of such adjunct materials.

Detersive Surfactants—Nonlimiting examples of surfactants useful in detergent compositions herein typically at levels from about 1% to about 55%, by weight, include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)x(CHOSO_3^-M^+)$ $CH_3$ and $CH_3$ $(CH_2)y$ $(CHOSO_3^-M^+)$ $CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates ("$AE_xS$"; especially EO 1–7 ethoxy sulfates), $C_{10}$–$C_{18}$ alkyl alkoxy carboxylates (especially the EO 1-5 ethoxycarboxylates), the $C_{10-18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like, can also be included in the overall compositions. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are listed in standard texts.

Builders—Detergent builders can optionally be included in the compositions herein to assist in controlling mineral hardness. Inorganic as well as organic builders can be used. Builders are typically used in fabric laundering compositions to assist in the removal of particulate soils.

The level of builder can vary widely depending upon the end use of the composition and its desired physical form. When present, the compositions will typically comprise at least about 1% builder. Liquid formulations typically comprise from about 5% to about 50%, more typically about 5% to about 30%, by weight, of detergent builder. Granular formulations typically comprise from about 10% to about 80%, more typically from about 15% to about 50% by weight, of the detergent builder. Lower or higher levels of builder, however, are not meant to be excluded.

Inorganic or P-containing detergent builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate builders are required in some locales. Importantly, the compositions herein function surprisingly well even in the presence of the so-called "weak" builders (as compared with phosphates) such as citrate, or in the so-called "underbuilt" situation that may occur with zeolite or layered silicate builders.

Examples of silicate builders are the alkali metal silicates, particularly those having a $SiO_2:Na_2O$ ratio in the range 1.6:1 to 3.2:1 and layered silicates, such as the layered sodium silicates described in U.S. Pat. No. 4,664,839, issued May 12, 1987 to H. P. Rieck. NaSKS-6 is the trademark for a crystalline layered silicate marketed by Hoechst (commonly abbreviated herein as "SKS-6"). Unlike zeolite builders, the Na SKS-6 silicate builder does not contain aluminum. NaSKS-6 has the delta-$Na_2SiO_5$ morphology form of layered silicate. It can be prepared by methods such as those described in German DE-A-3,417,649 and DE-A-3,742,043. SKS-6 is a highly preferred layered silicate for use herein, but other soh layered silicates, such as those having the general formula $NaMSi_xO_{2x+1}\cdot yH_2O$ wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the alpha, beta and gamma forms. As noted above, the delta- Na$_2$SiO$_5$ (NaSKS-6 form) is most preferred for use herein. Other silicates may also be useful such as for example magnesium silicate, which can serve as a crispening agent in granular formulations, as a stabilizing agent for oxygen bleaches, and as a component of suds control systems.

Examples of carbonate builders are the alkaline earth and alkali metal carbonates as disclosed in German Pat. Application No. 2,321,001 published on Nov. 15, 1973.

Aluminosilicate builders are useful in the present invention. Aluminosilicate builders are of great importance in most currently marketed heavy duty granular detergent compositions, and can also be a significant builder ingredient in liquid detergent formulations. Aluminosilicate builders include those having the empirical formula:

$$M_z[(zAlO_2)y] \cdot xH_2O$$

wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P (B), Zeolite MAP and Zeolite X. In an especially preferred embodiment, the crystalline aluminosilicate ion exchange material has the formula:

$$Na_{12}[(AlO_2)_{12}(SiO_2)_{12}] \cdot xH_2O$$

wherein x is from about 20 to about 30, especially about 27. This material is known as Zeolite A. Dehydrated zeolites (x=0–10) may also be used herein. Preferably, the aluminosilicate has a particle size of about 0.1–10 microns in diameter.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt. When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylene-diamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are polycarboxylate builders of particular importance for heavy duty liquid detergent formulations due to their availability from renewable resources and their biodegradability. Citrates can also be used in granular compositions, especially in combination with zeolite and/or layered silicate builders. Oxydisuccinates are also especially useful in such compositions and combinations.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986. Useful succinic acid builders include the C$_5$–C$_{20}$ alkyl and alkenyl succinic acids and salts thereof A particularly preferred compound of this type is dodecenylsuccinic acid. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 86200690.5/0,200,263, published Nov. 5, 1986.

Other suitable polycarboxylates are disclosed in U.S. Pat. No. 4,144,226, Crutchfield et al, issued Mar. 13, 1979 and in U.S. Pat. No. 3,308,067, Diehl, issued Mar. 7, 1967. See also Diehl U.S. Pat. No. 3,723,322.

Fatty acids, e.g., C$_{12}$–C$_{18}$ monocarboxylic acids, can also be incorporated into the compositions alone, or in combination with the aforesaid builders, especially citrate and/or the succinate builders, to provide additional builder activity. Such use of fatty acids will generally result in a diminution of sudsing, which should be taken into account by the formulator.

In situations where phosphorus-based builders can be used, and especially in the formulation of bars used for hand-laundering operations, the various alkali metal phosphates such as the well-known sodium tripolyphosphates, sodium pyrophosphate and sodium orthophosphate can be used. Phosphonate builders such as ethane-1-hydroxy-1,1-diphosphonate and other known phosphonates (see, for example, U.S. Pat. Nos. 3,159,581; 3,213,030; 3,422,021; 3,400,148 and 3,422,137) can also be used.

Enzymes—Optional enzymes can be included in the formulations herein for a wide variety of fabric laundering purposes, including removal of protein-based, carbohydrate-based, or triglyceride-based stains, for example, and for the prevention of refugee dye transfer, and for fabric restoration. The enzymes to be incorporated include amylases, lipases, cellulases, and peroxidases, as well as mixtures thereof Other types of enzymes may also be included. They may be of any suitable origin, such as vegetable, animal, bacterial, fungal and yeast origin. However, their choice is governed by several factors such as pH-activity and/or stability optima, thermostability, stability versus active detergents, builders and so on. In this respect bacterial or fungal enzymes are preferred, such as bacterial amylases and fungal cellulases.

Enzymes are normally incorporated at levels sufficient to provide up to about 5 mg by weight, more typically about 0.01 mg to about 3 mg, of active enzyme per gram of the composition. Stated otherwise, the compositions herein will typically comprise from about 0.001% to about 5%, preferably 0.01%–1% by weight of a commercial enzyme preparation.

Amylases include, for example, α-amylases described in British Patent Specification No. 1,296,839 (Novo), RAPIDASE, International Bio-Synthetics, Inc. and TERMAMYL, Novo Industries.

The cellulase usable in the present invention include both bacterial or fungal cellulase. Preferably, they will have a pH optimum of between 5 and 9.5. Suitable cellulases are disclosed in U.S. Pat. No. 4,435,307, Barbesgoard et al, issued Mar. 6, 1984, which discloses fungal cellulase produced from *Humicola insolens* and Humicola strain DSM1800 or a cellulase 212-producing fungus belonging to the genus Aeromonas, and cellulase extracted from the hepatopancreas of a marine mollusk (Dolabella Auricula Solander). suitable cellulases are also disclosed in GB-A-2.075.028; GB-A-2.095.275 and DE-OS-2.247.832. CAREZYME (Novo) is especially useful.

Suitable lipase enzymes for detergent usage include those produced by microorganisms of the Pseudomonas group, such as *Pseudomonas stutzeri* ATCC 19.154, as disclosed in British Patent 1,372,034. See also lipases in Japanese Patent Application 53,20487, laid open to public inspection on Feb. 24, 1978. This lipase is available from Amano Pharmaceutical Co. Ltd., Nagoya, Japan, under the trade name Lipase P "Amano," hereinafter referred to as "Amano-P." Other commercial lipases include Amano-CES, lipases ex *Chromobacter viscosum*, e.g. *Chromobacter viscosum* var. lipolyticum NRRLB 3673, commercially available from Toyo Jozo Co., Tagata, Japan; and further *Chromobacter viscosum* lipases from U.S. Biochemical Corp., U.S.A. and Disoynth Co., The Netherlands, and lipases ex *Pseudomonas gladioli*. The LIPOLASE enzyme derived from *Humicola lanuginosa* and commercially available from Novo (see also EPO 341,947) is a preferred lipase for use herein.

Peroxidase enzymes are used in combination with oxygen sources, e.g., percarbonate, perborate, persulfate, hydrogen peroxide, etc. They are used for "solution bleaching," i.e. to prevent transfer of dyes or pigments removed from substrates during wash operations to other substrates in the wash solution. Peroxidase enzymes are known in the art, and include, for example, horseradish peroxidase, ligninase, and haloperoxidase such as chloro- and bromo-peroxidase. Peroxidase-containing detergent compositions are disclosed, for example, in PCT International Application WO 89/099813, published Oct. 19, 1989, by O. Kirk, assigned to Novo Industries A/S.

A wide range of enzyme materials and means for their incorporation into synthetic detergent compositions are also disclosed in U.S. Pat. No. 3,553,139, issued Jan. 5, 1971 to McCarty et al. Enzymes are further disclosed in U.S. Pat. No. 4,101,457, Place et al, issued Jul. 18, 1978, and in U.S. Pat. No. 4,507,219, Hughes, issued Mar. 26, 1985, both. Enzyme materials useful for liquid detergent formulations, and their incorporation into such formulations, are disclosed in U.S. Pat. No. 4,261,868, Hora et al, issued Apr. 14, 1981. Enzymes for use in detergents can be stabilized by various techniques. Enzyme stabilization techniques are disclosed and exemplified in U.S. Pat. No. 3,600,319, issued Aug. 17, 1971 to Gedge, et al, and European Patent Application Publication No. 0 199 405, Application No. 86200586.5, published Oct. 29, 1986, Venegas. Enzyme stabilization systems are also described, for example, in U.S. Pat. No. 3,519,570.

Enzyme Stabilizers—The enzymes employed herein are stabilized by the presence of water-soluble sources of calcium and/or magnesium ions in the finished compositions which provide such ions to the enzymes. (Calcium ions are generally somewhat more effective than magnesium ions and are preferred herein if only one type of cation is being used.) Additional stability can be provided by the presence of various other art-disclosed stabilizers, especially borate species: see Severson, U.S. Pat. No. 4,537,706. Typical detergents, especially liquids, will comprise from about 1 to about 30, preferably from about 2 to about 20, more preferably from about 5 to about 15, and most preferably from about 8 to about 12, millimoles of calcium ion per liter of finished composition. This can vary somewhat, depending on the amount of enzyme present and its response to the calcium or magnesium ions. The level of calcium or magnesium ions should be selected so that there is always some minimum level available for the enzyme, after allowing for complexation with builders, fatty acids, etc., in the composition. Any water-soluble calcium or magnesium salt can be used as the source of calcium or magnesium ions, including, but not limited to, calcium chloride, calcium sulfate, calcium malate, calcium maleate, calcium hydroxide, calcium formate, and calcium acetate, and the corresponding magnesium salts. A small amount of calcium ion, generally from about 0.05 to about 0.4 millimoles per liter, is often also present in the composition due to calcium in the enzyme slurry and formula water. In solid detergent compositions the formulation may include a sufficient quantity of a water-soluble calcium ion source to provide such amounts in the laundry liquor. In the alternative, natural water hardness may suffice.

It is to be understood that the foregoing levels of calcium and/or magnesium ions are sufficient to provide enzyme stability. More calcium and/or magnesium ions can be added to the compositions to provide an additional measure of grease removal performance. Accordingly, as a general proposition the compositions herein will typically comprise from about 0.05% to about 2% by weight of a water-soluble source of calcium or magnesium ions, or both. The amount can vary, of course, with the amount and type of enzyme employed in the composition.

The compositions herein may also optionally, but preferably, contain various additional stabilizers, especially borate-type stabilizers. Typically, such stabilizers will be used at levels in the compositions from about 0.25% to about 10%, preferably from about 0.5% to about 5%, more preferably from about 0.75% to about 3%, by weight of boric acid or other borate compound capable of forming boric acid in the composition (calculated on the basis of boric acid). Boric acid is preferred, although other compounds such as boric oxide, borax and other alkali metal borates (e.g., sodium ortho-, meta- and pyroborate, and sodium pentaborate) are suitable. Substituted boric acids (e.g., phenylboronic acid, butane boronic acid, and p-bromo phenylboronic acid) can also be used in place of boric acid.

Polymeric Soil Release Agent—Any polymeric soil release agent known to those skilled in the art can optionally be employed in the compositions and processes of this invention. Polymeric soil release agents are characterized by having both hydrophilic segments, to hydrophilize the surface of hydrophobic fibers, such as polyester and nylon, and hydrophobic segments, to deposit upon hydrophobic fibers and remain adhered thereto through completion of washing and rinsing cycles and, thus, serve as an anchor for the hydrophilic segments. This can enable stains occurring subsequent to treatment with the soil release agent to be more easily cleaned in later washing procedures.

The polymeric soil release agents useful herein especially include those soil release agents having: (a) one or more nonionic hydrophile components consisting essentially of (i) polyoxyethylene segments with a degree of polymerization of at least 2, or (ii) oxypropylene or polyoxypropylene segments with a degree of polymerization of from 2 to 10, wherein said hydrophile segment does not encompass any oxypropylene unit unless it is bonded to adjacent moieties at each end by ether linkages, or (iii) a mixture of oxyalkylene units comprising oxyethylene and from 1 to about 30 oxypropylene units wherein said mixture contains a sufficient amount of oxyethylene units such that the hydrophile component has hydrophilicity great enough to increase the hydrophilicity of conventional polyester synthetic fiber surfaces upon deposit of the soil release agent on such surface, said hydrophile segments preferably comprising at least about 25% oxyethylene units and more preferably, especially for such components having about 20 to 30 oxypropylene units, at least about 50% oxyethylene units; or (b) one or more hydrophobe components comprising (i) $C_3$ oxyalkylene terephthalate segments, wherein, if said hydrophobe components also comprise oxyethylene terephthalate, the ratio of oxyethylene terephthalate:$C_3$ oxyalkylene terephthalate units is about 2:1 or lower, (ii) $C_4$–$C_6$ alkylene or oxy $C_4$–$C_6$ alkylene segments, or mixtures therein, (iii) poly (vinyl ester) segments, preferably polyvinyl acetate), having a degree of polymerization of at least 2, or (iv) $C_1$–$C_4$ alkyl ether or $C_4$ hydroxyalkyl ether substituents, or mixtures therein, wherein said substituents are present in the form of $C_1$–$C_4$ alkyl ether or $C_4$ hydroxyalkyl ether cellulose derivatives, or mixtures therein, and such cellulose derivatives are amphiphilic, whereby they have a sufficient level of $C_1$–$C_4$ alkyl ether and/or $C_4$ hydroxyalkyl ether units to deposit upon conventional polyester synthetic fiber surfaces and retain a sufficient level of hydroxyls, once adhered to such conventional synthetic fiber surface, to increase fiber surface hydrophilicity, or a combination of (a) and (b).

Typically, the polyoxyethylene segments of (a)(i) will have a degree of polymerization of from about 200, although higher levels can be used, preferably from 3 to about 150, more preferably from 6 to about 100. Suitable oxy $C_4$–$C_6$ alkylene hydrophobe segments include, but are not limited to, end-caps of polymeric soil release agents such as $MO_3S(CH_2)_nOCH_2CH_2O$—, where M is sodium and n is an integer from 4–6, as disclosed in U.S. Pat. No. 4,721,580, issued Jan. 26, 1988 to Gosselink.

Polymeric soil release agents useful in the present invention also include cellulosic derivatives such as hydroxyether cellulosic polymers, copolymeric blocks of ethylene terephthalate or propylene terephthalate with polyethylene oxide or polypropylene oxide terephthalate, and the like. Such agents are commercially available and include hydroxyethers of cellulose such as METHOCEL (Dow). Cellulosic soil release agents for use herein also include those selected from the group consisting of $C_1$–$C_4$ alkyl and $C_4$ hydroxyalkyl cellulose; see U.S. Pat. No. 4,000,093, issued Dec. 28, 1976 to Nicol, et al.

Soil release agents characterized by poly(vinyl ester) hydrophobe segments include graft copolymers of poly (vinyl ester), e.g., $C_1$–$C_6$ vinyl esters, preferably poly(vinyl acetate) grafted onto polyalkylene oxide backbones, such as polyethylene oxide backbones. See European Patent Application 0 219 048, published Apr. 22, 1987 by Kud, et al. Commercially available soil release agents of this kind include the SOKALAN type of material, e.g., SOKALAN HP-22, available from BASF (West Germany).

One type of preferred soil release agent is a copolymer having random blocks of ethylene terephthalate and polyethylene oxide (PEO) terephthalate. The molecular weight of this polymeric soil release agent is in the range of from about 25,000 to about 55,000. See U.S. Pat. No. 3,959,230 to Hays, issued May 25, 1976 and U.S. Pat. No. 3,893,929 to Basadur issued Jul. 8, 1975.

Another preferred polymeric soil release agent is a polyester with repeat units of ethylene terephthalate units contains 10–15% by weight of ethylene terephthalate units together with 90–80% by weight of polyoxyethylene terephthalate units, derived from a polyoxyethylene glycol of average molecular weight 300–5,000. Examples of this polymer include the commercially available material ZELCON 5126 (from Dupont) and MILEASE T (from ICI). See also U.S. Pat. No. 4,702,857, issued Oct. 27, 1987 to Gosselink.

Another preferred polymeric soil release agent is a sulfonated product of a substantially linear ester oligomer comprised of an oligomeric ester backbone of terephthaloyl and oxyalkyleneoxy repeat units and terminal moieties covalently attached to the backbone. These soil release agents are described fully in U.S. Pat. No. 4,968,451, issued Nov. 6, 1990 to J. J. Scheibel and E. P. Gosselink. Other suitable polymeric soil release agents include the terephthalate polyesters of U.S. Pat. No. 4,711,730, issued Dec. 8, 1987 to Gosselink et al, the anionic end-capped oligomeric esters of U.S. Pat. No. 4,721,580, issued Jan. 26, 1988 to Gosselink, and the block polyester oligomeric compounds of U.S. Pat. No. 4,702,857, issued Oct. 27, 1987 to Gosselink.

Preferred polymeric soil release agents also include the soil release agents of U.S. Pat. No. 4,877,896, issued Oct. 31, 1989 to Maldonado et al, which discloses anionic, especially sulfoarolyl, end-capped terephthalate esters.

If utilized, soil release agents will generally comprise from about 0.01% to about 10.0%, by weight, of the detergent compositions herein, typically from about 0.1% to about 5%, preferably from about 0.2% to about 3.0%.

Still another preferred soil release agent is an oligomer with repeat units of terephthaloyl units, sulfoisoterephthaloyl units, oxyethyleneoxy and oxy-1,2-propylene units. The repeat units form the backbone of the oligomer and are preferably terminated with modified isethionate end-caps. A particularly preferred soil release agent of this type comprises about one sulfoisophthaloyl unit, 5 terephthaloyl units, oxyethyleneoxy and oxy-1,2-propyleneoxy units in a ratio of from about 1.7 to about 1.8, and two end-cap units of sodium 2-(2-hydroxyethoxy)-ethanesulfonate. Said soil release agent also comprises from about 0.5% to about 20%, by weight of the oligomer, of a crystalline-reducing stabilizer, preferably selected from the group consisting of xylene sulfonate, cumene sulfonate, toluene sulfonate, and mixtures thereof.

Chelating Agents—The detergent compositions herein may also optionally contain one or more iron and/or manganese chelating agents. Such chelating agents can be selected from the group consisting of amino carboxylates, amino phosphonates, polyfunctionally-substituted aromatic chelating agents and mixtures therein, all as hereinafter defined. Without intending to be bound by theory, it is believed that the benefit of these materials is due in part to their exceptional ability to remove iron and manganese ions from washing solutions by formation of soluble chelates.

Amino carboxylates useful as optional chelating agents include ethylenediaminetetracetates, N-hydroxyethylethylenediaminetriacetates, nitrilotriacetates, ethylenediamine tetraproprionates, triethylenetetraaminehexacetates, diethylenetriaminepentaacetates, and ethanoldiglycines, alkali metal, ammonium, and substituted ammonium salts therein and mixtures therein.

Amino phosphonates are also suitable for use as chelating agents in the compositions of the invention when at lease low levels of total phosphorus are permitted in detergent compositions, and include ethylenediaminetetrakis (methylenephosphonates) as DEQUEST. Preferred, these amino phosphonates to not contain alkyl or alkenyl groups with more than about 6 carbon atoms.

Polyfunctionally-substituted aromatic chelating agents are also useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A preferred biodegradable chelator for use herein is ethylenediamine disuccinate ("EDDS"), especially the [S,S] isomer as described in U.S. Pat. No. 4,704,233, Nov. 3, 1987, to Hartman and Perkins.

If utilized, these chelating agents will generally comprise from about 0.1% to about 10% by weight of the detergent compositions herein. More preferably, if utilized, the chelating agents will comprise from about 0.1% to about 3.0% by weight of such compositions.

Clay Soil Removal/Anti-redeposition Agents—The compositions of the present invention can also optionally contain water-soluble ethoxylated amines having clay soil removal and antiredeposition properties. Granular detergent compositions which contain these compounds typically contain from about 0.01% to about 10.0% by weight of the water-soluble ethoxylates amines; liquid detergent compositions typically contain about 0.01% to about 5%.

The most preferred soil release and anti-redeposition agent is ethoxylated tetraethylenepentamine. Exemplary ethoxylated amines are further described in U.S. Pat. No. 4,597,898, VanderMeer, issued Jul. 1, 1986. Another group of preferred clay soil removal-antiredeposition agents are the cationic compounds disclosed in European Pat. Application 111,965, Oh and Gosselink, published Jun. 27, 1984. Other clay soil removal/antiredeposition agents which can be used include the ethoxylated amine polymers disclosed in European Pat. Application 111,984, 25 Gosselink, published Jun. 27, 1984; the zwitterionic polymers disclosed in European Patent Application 112,592, Gosselink, published Jul. 4, 1984; and the amine oxides disclosed in U.S. Pat. No. 4,548,744, Connor, issued Oct. 22, 1985. Other clay soil removal and/or anti redeposition agents known in the art can also be utilized in the compositions herein. Another type of preferred antiredeposition agent includes the carboxy methyl cellulose (CMC) materials. These materials are well known in the art.

Polymeric Dispersing Agents—Polymeric dispersing agents can advantageously be utilized at levels from about 0.1% to about 7%, by weight, in the compositions herein, especially in the presence of zeolite and/or layered silicate builders. Suitable polymeric dispersing agents include polymeric polycarboxylates and polyethylene glycols, although others known in the art can also be used. It is believed, though it is not intended to be limited by theory, that polymeric dispersing agents enhance overall detergent builder performance, when used in combination with other builders (including lower molecular weight polycarboxylates) by crystal growth inhibition, particulate soil release peptization, and anti-redeposition.

Polymeric polycarboxylate materials can be prepared by polymerizing or copolymerizing suitable unsaturated monomers, preferably in their acid form. Unsaturated monomeric acids that can be polymerized to form suitable polymeric polycarboxylates include acrylic acid, maleic acid (or maleic anhydride), fumaric acid, itaconic acid, aconitic acid, mesaconic acid, citraconic acid and methylenemalonic acid. The presence in the polymeric polycarboxylates herein or monomeric segments, containing no carboxylate radicals such as vinylmethyl ether, styrene, ethylene, etc. is suitable provided that such segments do not constitute more than about 40% by weight.

Particularly suitable polymeric polycarboxylates can be derived from acrylic acid. Such acrylic acid-based polymers which are useful herein are the water-soluble salts of polymerized acrylic acid. The average molecular weight of such polymers in the acid form preferably ranges from about 2,000 to 10,000, more preferably from about 4,000 to 7,000 and most preferably from about 4,000 to 5,000. Water-soluble salts of such acrylic acid polymers can include, for example, the alkali metal, ammonium and substituted ammonium salts. Soluble polymers of this type are known materials. Use of polyacrylates of this type in detergent compositions has been disclosed, for example, in Diehl, U.S. Pat. No. 3,308,067, issued Mar. 7, 1967.

Acrylic/maleic-based copolymers may also be used as a preferred component of the dispersing/anti-redeposition agent. Such materials include the water-soluble salts of copolymers of acrylic acid and maleic acid. The average molecular weight of such copolymers in the acid form preferably ranges from about 2,000 to 100,000, more preferably from about 5,000 to 75,000, most preferably from about 7,000 to 65,000. The ratio of acrylate to maleate segments in such copolymers will generally range from about 30:1 to about 1:1, more preferably from about 10:1 to 2:1. Water-soluble salts of such acrylic acid/maleic acid copolymers can include, for example, the alkali metal, ammonium and substituted ammonium salts. Soluble acrylate/maleate copolymers of this type are known materials which are described in European Patent Application No. 66915, published Dec. 15, 1982, as well as in EP 193,360, published Sep. 3, 1986, which also describes such polymers comprising hydroxypropylacrylate. Still other useful dispersing agents include the maleic/acrylic/vinyl alcohol terpolymers. Such materials are also disclosed in EP 193,360, including, for example, the 45/45/10 terpolymer of acrylic/maleic/vinyl alcohol.

Another polymeric material which can be included is polyethylene glycol (PEG). PEG can exhibit dispersing agent performance as well as act as a clay soil removal-antiredeposition agent. Typical molecular weight ranges for these purposes range from about 500 to about 100,000, preferably from about 1,000 to about 50,000, more preferably from about 1,500 to about 10,000.

Polyaspartate and polyglutamate dispersing agents may also be used, especially in conjunction with zeolite builders. Dispersing agents such as polyaspartate preferably have a molecular weight (avg.) of about 10,000.

Brightener—Any optical brighteners or other brightening or whitening agents known in the art can be incorporated at levels typically from about 0.05% to about 1.2%, by weight, into the detergent compositions herein. Commercial optical brighteners which may be useful in the present invention can be classified into subgroups, which include, but are not necessarily limited to, derivatives of stilbene, pyrazoline, coumarin, carboxylic acid, methinecyanines, dibenzothiphene-5,5-dioxide, azoles, 5- and 6-membered-ring heterocycles, and other miscellaneous agents. Examples of such brighteners are disclosed in "The Production and Application of Fluorescent Brightening Agents", M. Zahradnik, Published by John Wiley & Sons, New York (1982).

Specific examples of optical brighteners which are useful in the present compositions are those identified in U.S. Pat. No. 4,790,856, issued to Wixon on Dec. 13, 1988. These brighteners include the PHORWHITE series of brighteners from Verona. Other brighteners disclosed in this reference include: Tinopal UNPA, Tinopal CBS and Tinopal 5BM; available from Ciba-Geigy; Artic White CC and Artic White CWD, available from Hilton-Davis, located in Italy, the 2-(4-stryl-phenyl)-2H-napthol[1,2-d]triazoles; 4,4'-bis- (1,2, 3-triazol-2-yl)-stil- benes; 4,4'-bis(stryl)bisphenyls; and the aminocoumarins. Specific examples of these brighteners include 4-methyl-7-diethyl- amino coumarin; 1,2-bis(-venzimidazol-2-yl)ethylene; 1,3-diphenyl-phrazolines; 2,5-bis(benzoxazol-2-yl)thiophene; 2-stryl-napth-[1,2-d] oxazole; and 2-(stilbene-4-yl)-2H-naphtho- [1,2-d]triazole. See also U.S. Pat. No. 3,646,015, issued Feb. 29, 1972 to Hamilton. Anionic brighteners are preferred herein.

Suds Suppressors—Compounds for reducing or suppressing the formation of suds can be incorporated into the compositions of the present invention. Suds suppression can be of particular importance in the so-called "high concentration cleaning process" as described in U.S. Pat. Nos. 4,489,455 and 4,489,574 and in front-loading European-style washing machines.

A wide variety of materials may be used as suds suppressors, and suds suppressors are well known to those skilled in the art. See, for example, Kirk Othmer Encyclopedia of Chemical Technology, Third Edition, Volume 7, pages 430–447 (John Wiley & Sons, Inc., 1979). One category of suds suppressor of particular interest encompasses monocarboxylic fatty acid and soluble salts therein. See U.S. Pat. No. 2,954,347, issued Sep. 27, 1960 to Wayne St. John. The monocarboxylic fatty acids and salts thereof used as suds suppressor typically have hydrocarbyl chains of 10 to about 24 carbon atoms, preferably 12 to 18 carbon atoms. Suitable salts include the alkali metal salts such as sodium, potassium, and lithium salts, and ammonium and alkanolammonium salts.

The detergent compositions herein may also contain non-surfactant suds suppressors. These include, for example: high molecular weight hydrocarbons such as paraffin, fatty acid esters (e.g., fatty acid triglycerides), fatty acid esters of monovalent alcohols, aliphatic $C_{18}$–$C_{40}$ ketones (e.g., stearone), etc. Other suds inhibitors include N-alkylated amino triazines such as tri- to hexa-alkylmelamines or di- to tetra-alkyldiamine chlortriazines formed as products of cyanuric chloride with two or three moles of a primary or secondary amine containing 1 to 24 carbon atoms, propylene oxide, and monostearyl phosphates such as monostearyl alcohol phosphate ester and monostearyl di-alkali metal (e.g., K, Na, and Li) phosphates and phosphate esters. The hydrocarbons such as paraffin and haloparaffin can be utilized in liquid form. The liquid hydrocarbons will be liquid at room temperature and atmospheric pressure, and will have a pour point in the range of about −40° C. and about 50° C., and a minimum boiling point not less than about 110° C. (atmospheric pressure). It is also known to utilize waxy hydrocarbons, preferably having a melting point below about 100° C. The hydrocarbons constitute a preferred category of suds suppressor for detergent compositions. Hydrocarbon suds suppressors are described, for example, in U.S. Pat. No. 4,265,779, issued May 5, 1981 to Gandolfo et al. The hydrocarbons, thus, include aliphatic, alicyclic, aromatic, and heterocyclic saturated or unsaturated hydrocarbons having from about 12 to about 70 carbon atoms. The term "paraffin" as used in this suds suppressor discussion, is intended to include mixtures of true paraffins and cyclic hydrocarbons.

Another preferred category of non-surfactant suds suppressors comprises silicone suds suppressors. This category includes the use of polyorganosiloxane oils, such as polydimethylsiloxane, dispersions or emulsions of polyorganosiloxane oils or resins, and combinations of polyorganosiloxane with silica particles wherein the polyorganosiloxane is chemisorbed or fused onto the silica. Silicone suds suppressors are well known in the art and are, for example, disclosed in U.S. Pat. No. 4,265,779, issued May 5, 1981 to Gandolfo et al and European Patent Application No. 89307851.9, published Feb. 7, 1990, by Starch, M. S.

Other silicone suds suppressors are disclosed in U.S. Pat. No. 3,455,839 which relates to compositions and processes for defoaming aqueous solutions by incorporating therein small amounts of polydimethylsiloxane fluids.

Mixtures of silicone and silanated silica are described, for instance, in German Patent Application DOS 2,124,526. Silicone defoamers and suds controlling agents in granular detergent compositions are disclosed in U.S. Pat. No. 3,933, 672, Bartolotta et al, and in U.S. Pat. No. 4,652,392, Baginski et al, issued Mar. 24, 1987.

An exemplary silicone based suds suppressor for use herein is a suds suppressing amount of a suds controlling agent consisting essentially of:

(i) polydimethylsiloxane fluid having a viscosity of from about 20 cs. to about 1,500 cs. at 25° C.;

(ii) from about 5 to about 50 parts per 100 parts by weight of (i) of siloxane resin composed of $(CH_3)_3SiO_{1/2}$ units of $SiO_2$ units in a ratio of from $(CH_3)_3$ $SiO_{1/2}$ units and to $SiO_2$ units of from about 0.6:1 to about 1.2:1; and (iii) from about 1 to about 20 parts per 100 parts by weight of (i) of a solid silica gel.

In the preferred silicone suds suppressor used herein, the solvent for a continuous phase is made up of certain polyethylene glycols or polyethylene-polypropylene glycol copolymers or mixtures thereof (preferred), or polypropylene glycol. The primary silicone suds suppressor is branched/crosslinked and preferably not linear.

To illustrate this point further, typical liquid laundry detergent compositions with controlled suds will optionally comprise from about 0.001 to about 1, preferably from about 0.01 to about 0.7, most preferably from about 0.05 to about 0.5, weight % of said silicone suds suppressor, which comprises (1) a nonaqueous emulsion of a primary antifoam agent which is a mixture of (a) a polyorganosiloxane, (b) a resinous siloxane or a silicone resin-producing silicone compound, (c) a finely divided filler material, and (d) a catalyst to promote the reaction of mixture components (a), (b) and (c), to form silanolates; (2) at least one nonionic silicone surfactant; and (3) polyethylene glycol or a copolymer of polyethylene-polypropylene glycol having a solubility in water at room temperature of more than about 2 weight %; and without polypropylene glycol. Similar amounts can be used in granular compositions, gels, etc. See also U.S. Pat. Nos. 4,978,471, Starch, issued Dec. 18, 1990, and 4,983,316, Starch, issued Jan. 8, 1991, 5,288,431, Huber et al., issued Feb. 22, 1994, and U.S. Pat. Nos. 4,639,489 and 4,749,740, Aizawa et al at column 1, line 46 through column 4, line 35.

The silicone suds suppressor herein preferably comprises polyethylene glycol and a copolymer of polyethylene glycol/polypropylene glycol, all having an average molecular weight of less than about 1,000, preferably between about 100 and 800. The polyethylene glycol and polyethylene/polypropylene copolymers herein have a solubility in water at room temperature of more than about 2 weight %, preferably more than about 5 weight %.

The preferred solvent herein is polyethylene glycol having an average molecular weight of less than about 1,000, more preferably between about 100 and 800, most preferably between 200 and 400, and a copolymer of polyethylene glycol/polypropylene glycol, preferably PPG 200/PEG 300. Preferred is a weight ratio of between about 1:1 and 1:10, most preferably between 1:3 and 1:6, of polyethylene glycol:copolymer of polyethylene-polypropylene glycol.

The preferred silicone suds suppressors used herein do not contain polypropylene glycol, particularly of 4,000 molecular weight. They also preferably do not contain block copolymers of ethylene oxide and propylene oxide, like PLURONIC L101.

Other suds suppressors useful herein comprise the secondary alcohols (e.g., 2-alkyl alkanols) and mixtures of such alcohols with silicone oils, such as the silicones disclosed in U.S. Pat. Nos. 4,798,679, 4,075,118 and EP 150,872. The secondary alcohols include the $C_6$–$C_{16}$ alkyl alcohols having a $C_1$–$C_{16}$ chain. A preferred alcohol is 2-butyl octanol, which is available from Condea under the trademark ISOFOL 12. Mixtures of secondary alcohols are available under the trademark ISALCHEM 123 from Enichem. Mixed suds suppressors typically comprise mixtures of alcohol+silicone at a weight ratio of 1:5 to 5:1.

For any detergent compositions to be used in automatic laundry washing machines, suds should not form to the extent that they overflow the washing machine. Suds suppressors, when utilized, are preferably present in a "suds suppressing amount". By "suds suppressing amount" is meant that the formulator of the composition can select an amount of this suds controlling agent that will sufficiently control the suds to result in a low-sudsing laundry detergent for use in automatic laundry washing machines.

The compositions herein will generally comprise from 0% to about 5% of suds suppressor. When utilized as suds suppressors, monocarboxylic fatty acids, and salts therein, will be present typically in amounts up to about 5%, by weight, of the detergent composition. Preferably, from about 0.5% to about 3% of fatty monocarboxylate suds suppressor is utilized. Silicone suds suppressors are typically utilized in amounts up to about 2.0%, by weight, of the detergent composition, although higher amounts may be used. This upper limit is practical in nature, due primarily to concern with keeping costs minimized and effectiveness of lower amounts for effectively controlling sudsing. Preferably from about 0.01% to about 1% of silicone suds suppressor is used, more preferably from about 0.25% to about 0.5%. As used herein, these weight percentage values include any silica that may be utilized in combination with polyorganosiloxane, as well as any adjunct materials that may be utilized. Monostearyl phosphate suds suppressors are generally utilized in amounts ranging from about 0.1% to about 2%, by weight, of the composition. Hydrocarbon suds suppressors are typically utilized in amounts ranging from about 0.01% to about 5.0%, although higher levels can be used. The alcohol suds suppressors are typically used at 0.2%–3% by weight of the finished compositions.

Fabric Softeners—Various through-the-wash fabric softeners, especially the impalpable smectite clays of U.S. Pat. No. 4,062,647, Storm and Nirschl, issued Dec. 13, 1977, as well as other softener clays known in the art, can optionally be used typically at levels of from about 0.5% to about 10% by weight in the present compositions to provide fabric softener benefits concurrently with fabric cleaning. Clay softeners can be used in combination with amine and cationic softeners as disclosed, for example, in U.S. Pat. No. 4,375,416, Crisp et al, Mar. 1, 1983 and U.S. Pat. No. 4,291,071, Harris et al, issued Sep. 22, 1981.

Other Ingredients—A wide variety of other ingredients useful in detergent compositions can be included in the compositions herein, including other active ingredients, carriers, hydrotropes, processing aids, dyes or pigments, solvents for liquid formulations, solid fillers for bar compositions, etc. If high sudsing is desired, suds boosters such as the $C_{10}$–$C_{16}$ alkanolamides can be incorporated into the compositions, typically at 1%–10% levels. The $C_{10}$–$C_{14}$ monoethanol and diethanol amides illustrate a typical class of such suds boosters. Use of such suds boosters with high sudsing adjunct surfactants such as the amine oxides, betaines and sultaines noted above is also advantageous. If desired, soluble magnesium salts such as $MgCl_2$, $MgSO_4$, and the like, can be added at levels of, typically, 0.1%–2%, to provide additional suds and to enhance grease removal performance.

Various detersive ingredients employed in the present compositions optionally can be further stabilized by absorbing said ingredients onto a porous hydrophobic substrate, then coating said substrate with a hydrophobic coating. Preferably, the detersive ingredient is admixed with a surfactant before being absorbed into the porous substrate. In use, the detersive ingredient is released from the substrate into the aqueous washing liquor, where it performs its intended detersive function.

To illustrate this technique in more detail, a porous hydrophobic silica (trademark SIPERNAT D10, DeGussa) is admixed with a proteolytic enzyme solution containing 3%–5% of $C_{13}$–$C_{15}$ ethoxylated alcohol (EO 7) nonionic surfactant. Typically, the enzyme/surfactant solution is 2.5 X the weight of silica. The resulting powder is dispersed with stirring in silicone oil (various silicone oil viscosities in the range of 500–12,500 can be used). The resulting silicone oil dispersion is emulsified or otherwise added to the final detergent matrix. By this means, ingredients such as the aforementioned enzymes, bleaches, bleach activators, bleach catalysts, photoactivators, dyes, fluorescers, fabric conditioners and hydrolyzable surfactants can be "protected" for use in detergents, including liquid laundry detergent compositions.

Liquid detergent compositions can contain water and other solvents as carriers. Low molecular weight primary or secondary alcohols exemplified by methanol, ethanol, propanol, and isopropanol are suitable. Monohydric alcohols are preferred for solubilizing surfactant, but polyols such as those containing from 2 to about 6 carbon atoms and from 2 to about 6 hydroxy groups (e.g., 1,3-propanediol, ethylene glycol, glycerine, and 1,2-propanediol) can also be used. The compositions may contain from 5% to 90%, typically 10% to 50% of such carriers.

The detergent compositions herein will preferably be formulated such that, during use in aqueous cleaning operations, the wash water will have a pH of between about 6.5 and about 11, preferably between about 7.5 and 10.5. Liquid dishwashing product formulations preferably have a pH between about 6.8 and about 9.0. Laundry products are typically at pH 9-11. Techniques for controlling pH at recommended usage levels include the use of buffers, alkalis, acids, etc., and are well known to those skilled in the art.

Dye Transfer Inhibiting Agents—The compositions of the present invention may also include one or more materials effective for inhibiting the transfer of dyes from one fabric to another during the cleaning process. Generally, such dye transfer inhibiting agents include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents typically comprise from about 0.01% to about 10% by weight of the composition, preferably from about 0.01% to about 5%, and more preferably from about 0.05% to about 2%.

More specifically, the polyamine N-oxide polymers preferred for use herein contain units having the following structural formula: R-$A_x$-P; wherein P is a polymerizable unit to which an N—O group can be attached or the N—O group can form part of the polymerizable unit or the N—O group can be attached to both units; A is one of the following structures: —NC(O)—, —C(O)O—, —S—, —O—, —N=; x is 0 or 1; and R is aliphatic, ethoxylated aliphatics, aromatics, heterocyclic or alicyclic groups or any combination thereof to which the nitrogen of the N—O group can be attached or the N—O group is part of these groups. Preferred polyamine N-oxides are those wherein R is a heterocyclic group such as pyridine, pyrrole, imidazole, pyrrolidine, piperidine and derivatives thereof.

The N—O group can be represented by the following general structures:

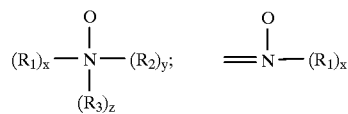

wherein $R_1$, $R_2$, $R_3$ are aliphatic, aromatic, heterocyclic or alicyclic groups or combinations thereof, x, y and z are 0 or 1; and the nitrogen of the N—O group can be attached or form part of any of the aforementioned groups. The amine oxide unit of the polyamine N-oxides has a pKa<10, preferably pKa<7, more preferred pKa<6.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof. These polymers include random or block copolymers where one monomer type is an amine N-oxide and the other monomer type is an N-oxide. The amine N-oxide polymers typically have a ratio of amine to the amine N-oxide of 10:1 to 1:1,000,000. However, the number of amine oxide groups present in the polyamine oxide polymer can be varied by appropriate copolymerization or by an appropriate degree of N-oxidation. The polyamine oxides can be obtained in almost any degree of polymerization. Typically, the average molecular weight is within the range of 500 to 1,000,000; more preferred 1,000 to 500,000; most preferred 5,000 to 100,000. This preferred class of materials can be referred to as "PVNO".

The most preferred polyamine N-oxide useful in the detergent compositions herein is poly(4-vinylpyridine-N-oxide) which as an average molecular weight of about 50,000 and an amine to amine N-oxide ratio of about 1:4.

Copolymers of N-vinylpyrrolidone and N-vinylimidazole polymers (referred to as a class as "PVPVI") are also preferred for use herein. Preferably the PVPVI has an average molecular weight range from 5,000 to 1,000,000, more preferably from 5,000 to 200,000, and most preferably from 10,000 to 20,000. (The average molecular weight range is determined by light scattering as described in Barth, et al., *Chemical Analysis*, Vol 113. "Modern Methods of Polymer Characterization", the disclosures of which are incorporated herein by reference.) The PVPVI copolymers typically have a molar ratio of N-vinylimidazole to N-vinylpyrrolidone from 1:1 to 0.2:1, more preferably from 0.8:1 to 0.3:1, most preferably from 0.6:1 to 0.4:1. These copolymers can be either linear or branched.

The present invention compositions also may employ a polyvinyl-pyrrolidone ("PVP") having an average molecular weight of from about 5,000 to about 400,000, preferably from about 5,000 to about 200,000, and more preferably from about 5,000 to about 50,000. PVP's are known to persons skilled in the detergent field; see, for example, EP-A-262,897 and EP-A-256,696, incorporated herein by reference. Compositions containing PVP can also contain polyethylene glycol ("PEG") having an average molecular weight from about 500 to about 100,000, preferably from about 1,000 to about 10,000. Preferably, the ratio of PEG to PVP on a ppm basis delivered in wash solutions is from about 2:1 to about 50:1, and more preferably from about 3:1 to about 10:1.

The detergent compositions herein may also optionally contain from about 0.005% to 5% by weight of certain types of hydrophilic optical brighteners which also provide a dye transfer inhibition action. If used, the compositions herein will preferably comprise from about 0.01% to 1% by weight of such optical brighteners.

The hydrophilic optical brighteners useful in the present invention are those having the structural formula:

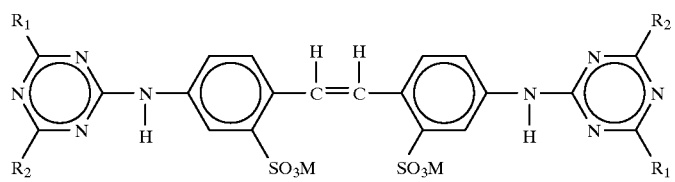

wherein $R_1$ is selected from anilino, N-2-bis-hydroxyethyl and NH-2-hydroxyethyl; $R_2$ is selected from N-2-bis-hydroxyethyl, N-2-hydroxyethyl-N-methylamino, morphilino, chloro and amino; and M is a salt-forming cation such as sodium or potassium.

When in the above formula, $R_1$ is anilino, $R_2$ is N-2-bis-hydroxyethyl and M is a cation such as sodium, the brightener is 4,4',-bis[(4-anilino-6-(N-2-bis-hydroxyethyl)-s-triazine-2-yl)amino]-2,2'-stilbenedisulfonic acid and disodium salt. This particular brightener species is commercially marketed under the tradename Tinopal-UNPA-GX by Ciba-Geigy Corporation. Tinopal-UNPA-GX is the preferred hydrophilic optical brightener useful in the detergent compositions herein.

When in the above formula, $R_1$ is anilino, $R_2$ is N-2-hydroxyethyl-N-2-methylamino and M is a cation such as sodium, the brightener is 4,4'-bis[(4-anilino-6-(N-2-hydroxyethyl-N-methylamino)-s-triazine-2-yl)amino]2,2'-stilbenedisulfonic acid disodium salt. This particular brightener species is commercially marketed under the tradename Tinopal 5BM-GX by Ciba-Geigy Corporation.

When in the above formula, $R_1$ is anilino, $R_2$ is morphilino and M is a cation such as sodium, the brightener is 4,4'-bis[[(4-anilino-6-morphilino-s-triazine-2-yl)amino]2,2'-stilbenedisulfonic acid, sodium salt. This particular brightener species is commercially marketed under the tradename Tinopal AMS-GX by Ciba Geigy Corporation.

The specific optical brightener species selected for use in the present invention provide especially effective dye transfer inhibition performance benefits when used in combination with the selected polymeric dye transfer inhibiting agents hereinbefore described. The combination of such selected polymeric materials (e.g., PVNO and/or PVPVI) with such selected optical brighteners (e.g., Tinopal UNPA-GX, Tinopal 5BM-GX and/or Tinopal AMS-GX) provides significantly better dye transfer inhibition in aqueous wash solutions than does either of these two detergent composition components when used alone. Without being bound by theory, it is believed that such brighteners work this way because they have high affinity for fabrics in the wash solution and therefore deposit relatively quick on these fabrics. The extent to which brighteners deposit on fabrics in the wash solution can be defined by a parameter called the "exhaustion coefficient". The exhaustion coefficient is in general as the ratio of a) the brightener material deposited on fabric to b) the initial brightener concentration in the wash liquor. Brighteners with relatively high exhaustion coefficients are the most suitable for inhibiting dye transfer in the context of the present invention.

Of course, it will be appreciated that other, conventional optical brightener types of compounds can optionally be used in the present compositions to provide conventional fabric "brightness" benefits, rather than a true dye transfer inhibiting effect. Such usage is conventional and well-known to detergent formulations.

The following examples illustrate compositions according to the invention, but are not intended to be limiting thereof.

EXAMPLE I

A bleach composition is as follows:

| Ingredient | % (Wt.) |
|---|---|
| Sodium Percarbonate | 20.0 |
| (6-nonanamidocaproyl)oxybenzenesulfonate | 10.0 |
| Protease Enzyme* | 1.0 |
| Water-soluble filler** | Balance |

*Protease C
**Sodium carbonate, sodium silicate mixture (1:1).

The compositions of Example I can be used per se as a bleach, or can be added to a pre-soak or surfactant-containing detergent composition to impart a bleaching benefit thereto. Fabrics exposed to the compositions of Example I exhibit more performance benefits on dingy soils than the added single contributions of bleach and protease would predict.

What is claimed is:

1. A bleaching composition which provides dingy clean up, comprising
   a) at least about 0.001% by weight of a protease enzyme selected from the group consisting of a protease enzyme having N76D/S103A/V104I subtilisin variant derived from *Bacillus lentus subtilisin,* a protease enzyme having K27R/V104I/N123S/T274A subtilisin variant derived from *Bacillus lentus subtilisin* and mixtures thereof;
   b) from about 1% to about 75% by weight of a bleaching compound capable of yielding hydrogen peroxide in a liquid; and
   c) from about 0.1% to about 50% by weight of one or more bleach activators selected from the group consisting of:
      i) alkanoyloxybenzenesulfonate bleach activators;
      ii) an amido-derived bleach activator of the general formula:

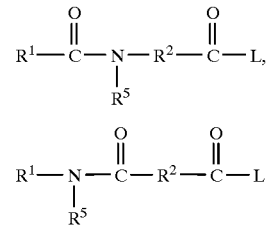

or mixtures thereof, wherein $R_1$ is an alkyl, aryl or alkaryl group containing from about 1 to about 14 carbon atoms, $R^2$ is an alkylene, arylene, or alkyarylene group containing from about 1 to about 14 carbon atoms, $R^5$ is H or an alkyl, aryl or alkaryl group containing from about 1 to about 10 carbon atoms, and L is a leaving group;
      iii) N-acyl lactam bleach activators of the formula:

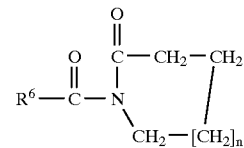

wherein n is from 0 to about 8 and $R^6$ is H, an alkyl, alkoxyaryl or alkaryl group containing from 1 to 12 carbon atoms, or a substituted phenyl group containing from about 6 to about 18 carbon atoms;
      iv) mixtures of i), ii) and iii); and.

2. A bleaching composition according to claim 1 wherein said bleaching compound is percarbonate or perborate or mixtures thereof, said bleach activator is selected from the group consisting of benzoyl caprolactam, benzoyl valerolactam, nonanoyl caprolactam, nonanoyl valerolactam, 4-nitrobenzoyl caprolactam, 4-nitrobenzoyl valerolactam, octanoyl caprolactam, octanoyl valerolactam, decanoyl caprolactam, decanoyl valerolactam, undecanoyl caprolactam, undecanoyl valerolactam, 3,5,5-trimethylhexanoyl caprolactam, 3,5,5-trimethyl-hexanoyl valerolactam, dinitrobenzoyl caprolactam, dinitrobenzoyl valerolactam, terephthaloyl dicaprolactam, terephthaloyl divalerolactam, (6-octanamidocaproyl) oxybenzenesulfonate, (6-nonanamido-caproyl) oxybenzenesulfonate, (6-decanamidcaproyl)oxybenzene sulfonate, benzoyloxybenzenesulfonate and mixtures thereof.

3. A bleaching composition which provides dingy clean up, comprising at least about 0.001% to about 5% by weight of a proteases enzyme selected from the group consisting of a protease enzyme having N76D/S103A/V104I subtilisin variant derived from *Bacillus lentus subtilisin,* a protease enzyme having K27R/V104I/N123S/T274A subtilisin variant derived from *Bacillus lentus subtilisin* and mixtures thereof, from about 1% to about 75% by weight of a bleaching compound capable of yielding hydrogen peroxide in a aqueous liquor and selected from the group consisting of perborates, percarbonates and mixtures thereof, and from about 0.1% to about 50% by weight one or more bleach activators selected from the group consisting of acyl caprolactams, acyl valerolactams, (6-octanamidocaproyl) oxybenzenesulfonate, (6-nonanamidocaproyl) oxybenzenesulfonate, (6-decanamidcaproyl)oxybenzene sulfonate and mixtures thereof.

4. A composition according to claim 3 wherein said composition further comprises an alkanoyloxybenzene-sulfonate bleach activator.

5. A composition according to claim 3 wherein said composition further comprises a detersive surfactant.

* * * * *

UNITED STATES PATENT AND TRADEMARK OFFICE
CERTIFICATE OF CORRECTION

PATENT NO. : 5,932,532
DATED : August 3, 1999
INVENTOR(S) : Chanchal Kumar Ghosh et al.

It is certified that error appears in the above-identified patent and that said Letters Patent is hereby corrected as shown below:

Title page, item [63] and column 1, line 9,

Related U.S. Application Data should read -- Continuation of application No. 08/643,390, May 6, 1996, which is a continuation of application No. 08/232,510, Apr. 22, 1994--.

Signed and Sealed this

Sixth Day of June, 2000

*Attest:*

Q. TODD DICKINSON

*Attesting Officer*     *Director of Patents and Trademarks*